United States Patent [19]
Fritsch et al.

[11] 3,943,640
[45] Mar. 16, 1976

[54] APPARATUS FOR DRYING STRANDS OF PLASTICS MATERIAL DURING THE MANUFACTURE OF PLASTICS GRANULES

[76] Inventors: Rudolf Paul Fritsch, Goslarer Str. 59, 7 Stuttgart 31; Eckhard Reiner Bohnert, Stiegelstr. 42, 7141 Schwieberdingen, both of Germany

[22] Filed: Oct. 15, 1974

[21] Appl. No.: 514,735

[30] Foreign Application Priority Data
Oct. 13, 1973 Germany............................ 2351503

[52] U.S. Cl. .................... 34/242; 34/16; 34/23; 34/92; 425/85
[51] Int. Cl.² ........................................ F26B 25/00
[58] Field of Search ....... 425/425, 445, 85, 86, 363, 425/80, 84, 73; 34/16, 23, 92, 242

[56] References Cited
UNITED STATES PATENTS

| | | | |
|---|---|---|---|
| 3,189,929 | 6/1965 | Koppehele | 34/92 X |
| 3,615,821 | 10/1971 | Miller | 34/16 |
| 3,722,899 | 3/1973 | Sedwell | 34/242 |
| 3,864,840 | 2/1975 | Baskin | 34/92 |

*Primary Examiner*—John J. Camby
*Attorney, Agent, or Firm*—Shenier & O'Connor

[57] ABSTRACT

In order to dry wet strands of plastics which have been passed through a cooling bath during the manufacture of plastics granules, we provide an apparatus and a process in which the strands are fed through a gap and a current of air is passed through the gap in order to dry the strands.

3 Claims, 2 Drawing Figures

APPARATUS FOR DRYING STRANDS OF PLASTICS MATERIAL DURING THE MANUFACTURE OF PLASTICS GRANULES

BACKGROUND OF THE INVENTION

The invention relates to apparatus and a method for drying at least one strand of plastics material, more particularly those strands which are passed through a cooling bath during the manufacture of plastics granules. Normally, a plurality of strands are treated simultaneously, in side-by-side relationship.

The most diverse apparatus of this kind are already known, all of which however do not work in a satisfactory manner. In a first type of construction, the strands of plastics material are passed over rolls having perforated walls through which air is blown radially outwardly. Especially when higher strand speeds are employed — high speeds are desirable in view of the economical operation of the entire plant — the strands are insufficiently dried, since the time during which the perforations in the rolls can operate is shortened, in addition to which the water forms a meniscus between each strand of plastics material and the surface of the roll and is not removed. Furthermore, these perforated rolls act like sirens when rotating at high speed. In a second type of construction, the cooled strands are supported on an endless screen belt and are passed over suction boxes like in a paper-making machine; however, the above-mentioned meniscus formation cannot be prevented, so that the drying is also inadequate in this case.

Finally, it is also known to granulate the strands in a water bath, and to use centrifuges or vibrating screens to separate the cooling water from the granules. This is much too complicated for economical manufacture and also produces an inadequately dried granulated product.

SUMMARY OF THE INVENTION

The present invention provides apparatus for drying at least one wet strand of plastics material, comprising feed means for feeding the strand through at least one gap and means for passing a current of air through the gap, and the invention also provides a method of drying at least one wet strand of plastics material, comprising feeding the strand through a gap while passing a current of air through the gap.

The invention provides a continuously operable apparatus and method which enable the strands of plastics material to be dried more completely in a cheaper manner than is the case when making use of the known constructions referred to above. In contradistinction to the known screen rolls, in the apparatus of the invention, all of the air current generated acts upon the strands of plastics material to be dried and extremely high air flow rates can be achieved in such a gap. This is especially so if the air is passed through the gap in the opposite direction to the strand(s), since in such a case the relative speed of the air to the strand(s) is the sum of the velocities of the air and of the strand(s). In this case, moreover, using a vacuum which can be generated quite economically, flow speeds of up to 80 meters per second can be achieved, with the result that the strand(s) of plastics material can be substantially dried while passing through a single gap.

In a preferred embodiment of the invention, the gap is formed by a pair of cooperating rolls which are arranged to be driven so that their peripheral surfaces adjacent the gap move in the same direction as the strand. This embodiment can have the advantage that scarcely any film of water can form on the walls of the gap, since the water is flung off from the rotating peripheral surfaces of the rollers; in addition, if the air is flowing in the opposite direction to the strand(s), its high velocity in relation to the peripheral surfaces of the rolls blows the surfaces dry in the region of the gap. Moreover, no difficulties are encountered when the strand passes through the gap since the walls of the gap can rotate at the same speed as that of the strand.

The efficiency of drying can be improved if the width of the gap is greater than the width (normally the diameter) of the strand or individual strands, since the meniscus with its detrimental effect cannot be formed between any strand and both gap walls, and if the feed of the strand is such that it passes through the gap out of contact with both gap walls, no such meniscus can be formed.

In a preferred embodiment of the invention, the gap is at the strand outlet from a suction chamber, the strand inlet being formed by the nip of a pair of rolls which are substantially in contact over substantially their whole length and are arranged to be rotated so that their peripheral surfaces adjacent the nip move in the same direction as the strand, at least one of the rolls having a resilient surface arranged such that the strand will be embedded therein; at least one of the rolls can be positively driven. In this manner the suction chamber can be sealed off in a particularly satisfactory and simple manner at the region where the strands enter the chamber.

In general, it is better if there is a plurality of the gaps in series, and in particular a plurality of suction chambers be arranged in series; tests have shown that with an apparatus having three suction chambers arranged in series, in the first suction chamber 70% of the water adhering to the strands of plastics material is removed, in the second suction chamber 25% is removed and the remaining 5% is removed in the third suction chamber.

Deflectors such as baffle plates can be included for deflecting the air after it has passed over the strand and separating out the coolant, so as to recover the coolant, because specially prepared water, e.g. desalinified water, is usually employed in plants for the manufacture of plastics granules, and because as much of the water as possible should be recovered as it is expensive.

BRIEF DESCRIPTION OF THE DRAWINGS

The invention will be further described, by way of example, with reference to the accompanying diagrammatic drawings, in which.

DETAILED DESCRIPTION OF A PREFERRED EMBODIMENT OF THE INVENTION

The general process of forming hot strands of plastics material, cooling them with water and cutting them into very short lengths to form granules is described in U.S. Pat. Nos. 3,609,805 and 3,808,929, the contents of which are incorporated by reference. The plastics material may be for instance polyethylene, polypropylene, polystyrole or polyvinylchloride. The strand diameter is preferably between 0.5 mm and 2 mm, or larger.

Figure 1:
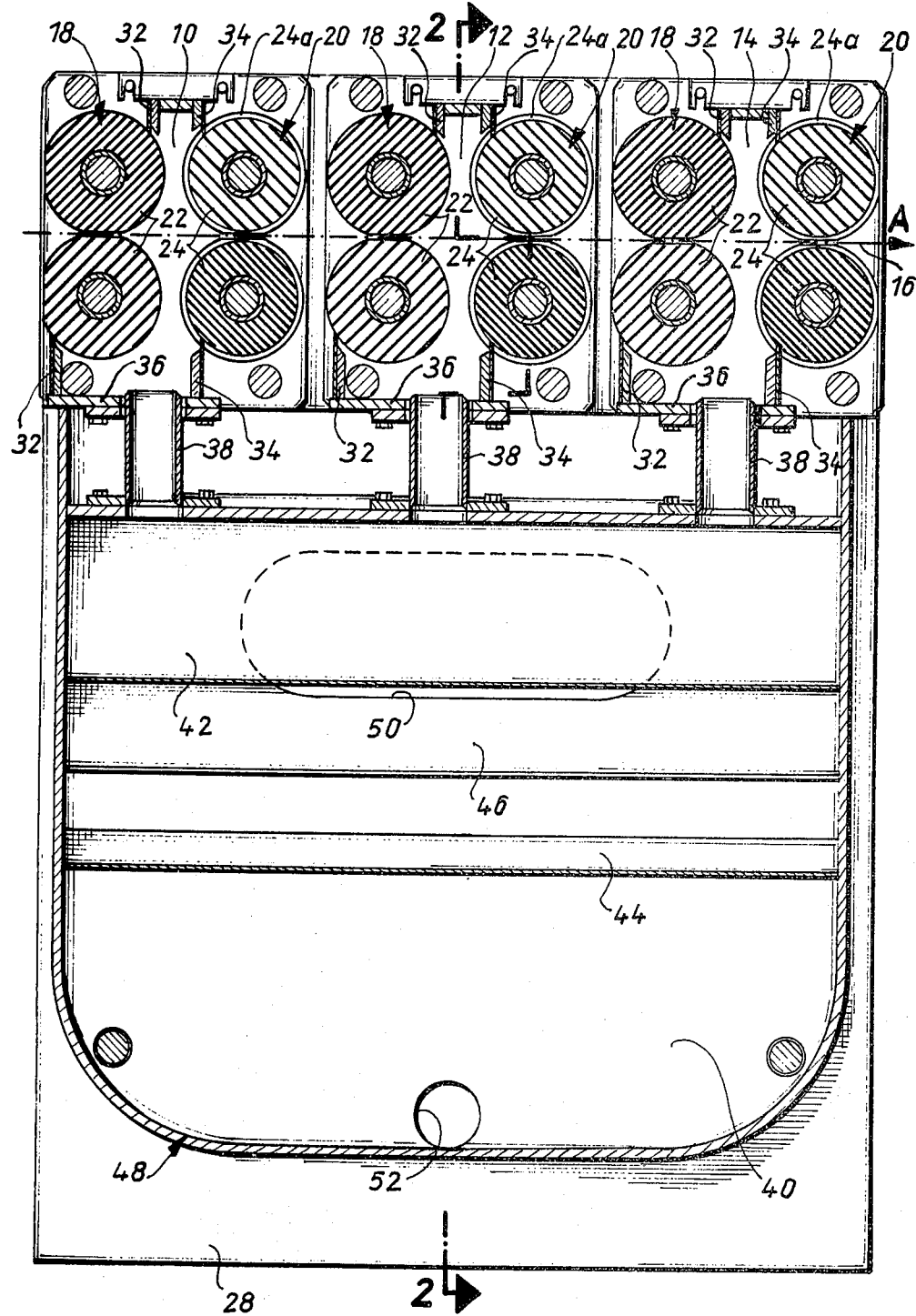
FIG. 1 is a first section through an embodiment of the invention, taken perpendicular to the axles of the pairs of rolls.
Figure 2:
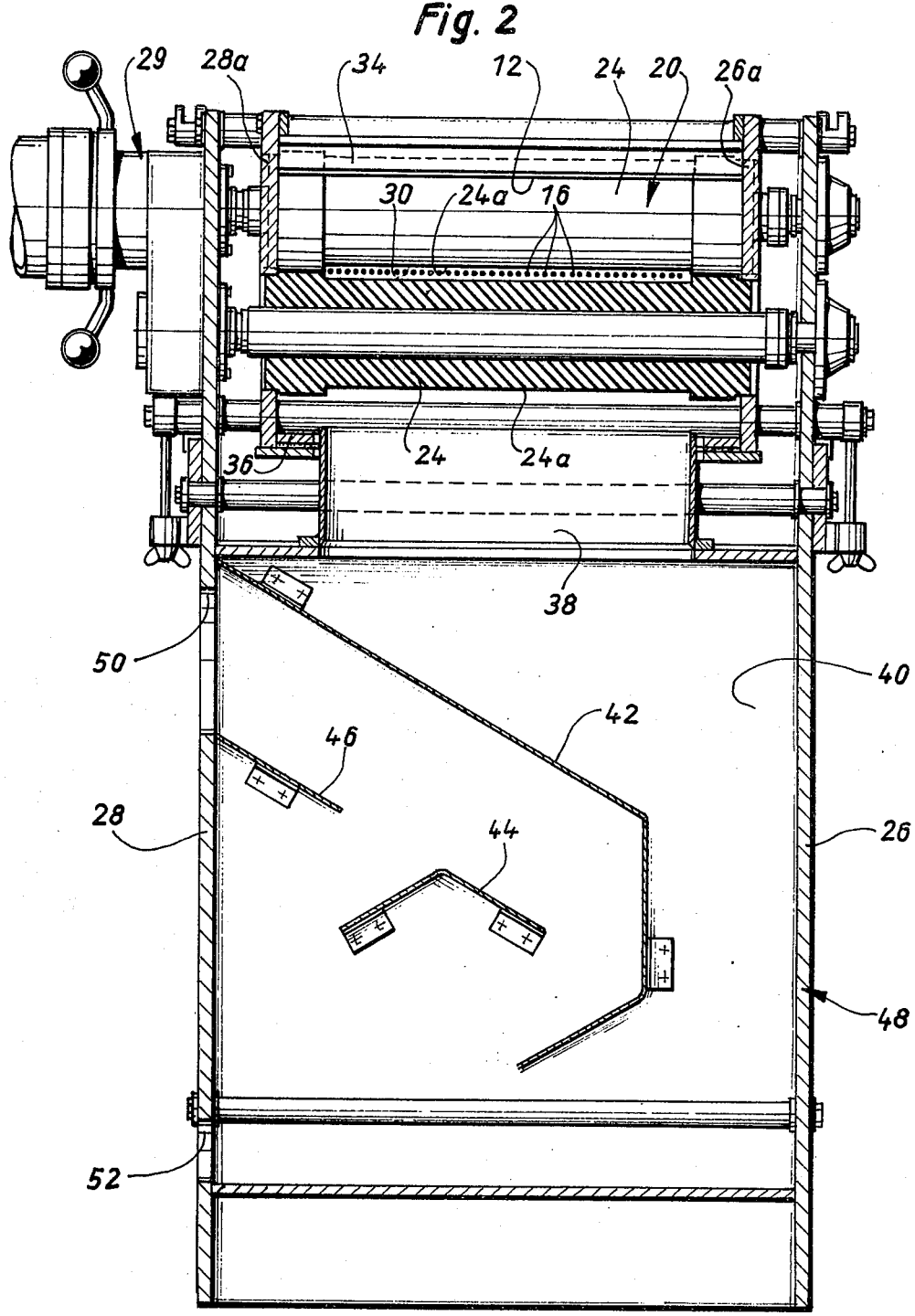
FIG. 2 is a section along the line 2—2 of FIG. 1.

It will be seen from FIG. 1 that the apparatus shown includes three suction chambers 10 to 14; the strands of plastics material 16 (shown in broken lines) are passed through the suction chambers 10 to 14 in succession, in the direction of the arrow A. Each suction chamber is formed substantially by a first and a second pair of rolls 18 and 20 respectively, and the rolls 22 and 24 of these pairs are, as can be seen clearly from FIG. 2, journalled in side walls 26 and 28 of the apparatus. Moreover, each pair of rolls is driven in the same direction as that of the movement of the strands of plastics material by means of a drive unit 29 shown in FIG. 2.

The rolls 22 of each first pair 18 are in mutual contact over their entire length and each consists of a relatively soft elastic material, thereby having a resilient surface. By virtue of their elasticity, no difficulties are encountered when starting up the plant for the manufacture of plastics granules — the freshly extruded strands of plastics material are thickened at their ends; moreover the first pair of rolls form an efficient seal on the inlet side of each suction chamber, since the strands of plastics material bed down into the material of the rollers.

The rolls 24 of the second pair 20 on the outlet side each include a wide flat recess 24a, and the recesses of the two rolls of a pair leave a gap 30, the width of which is greater than the diameter of the individual strands of plastics material 16. If the strand diameter is 2 mm, the gap width may be for instance 3 or 4 mm, but the width is variable to suit operating conditions.

Finally, sealing flaps 32 and 34 extending along the rolls 22 and 24 respectively, side cheeks 26a and 28a occupying the end regions of the rollers and a floor member 36 for each chamber into each of which opens an oval cross-section suction connection 38, all form the sealing means for each suction chamber. Each suction connection 38 connects the suction chambers 10 to 14 with a deflecting chamber 40 (see FIG. 2) common to all the suction chambers, in which are mounted baffles 42, 44 and 46, extending between the side walls of a trough 48, which together with the side walls 26 and 28 forms the deflector chamber 40. A vacuum source (not shown) is connected to the deflector chamber 40 by means of an oval aperture 50 in the side wall 28 and the cooling water separated out in the deflector chamber is drawn off through an opening 52.

OPERATION OF THE EMBODIMENT

The apparatus operates as follows.

The strands of plastics material 16 entering via the pair of rolls 18 of the first suction chamber 10 have previously passed through a cooling bath charged with decalcified or desalinified water in a conventional manner, so that cooling water adheres to the surfaces thereof. The speed of the strands 16 may be of the order of several meters per second. Through the action of the driven rolls 22, the strands 16 are passed through the suction chambers 10–14. On account of the vacuum in the deflector chamber 40 and in the suction chambers 10–14, a powerful current of air is set up in the gaps 30 of the second pairs of rolls 20 in counterflow to the direction of movement of the strands of plastics material, by which means, since the apparatus is open at the top, air is drawn from above into the suction chambers. Tests have shown that under a vacuum of only 450 mm water column in the suction chambers 10–14, flow velocities of up to 80 meters per second are attained in the gaps 30, to which must be added the speed of the strands 16, when considering the action of the current of air upon the water adhering to the strands 16. Tests have also shown that the strands 16 do not come into contact with the walls of the gap 30 formed by the peripheral surfaces of the rolls 24, so that the surfaces of the rolls 24 remain substantially dry. Moreover, any water was immediately blown off the surfaces of the rolls 24, since the current of air has the same relative velocity in relation to these surfaces as it has in relation to the strands 16.

The water droplets with the entraining air follow a labyrinthine path, first impinging on the baffle plate 42, the against the side wall 26, then against the floor of the trough 48, and finally against the baffles 44 and 46 and again coming into contact with the baffle 42; the droplets are thus precipitated and the water collecting on the floor of the trough 48 is drawn off through the aperture 52 and re-used in the cooling bath of the plant.

We claim:

1. Apparatus for drying a wet strand of plastic material which has been passed through a cooling bath during a manufacturing operation, said apparatus comprising a pair of cooperating rolls;

means mounting said rolls in cooperative relationship with peripheral surface portions thereof in the area of cooperation forming a gap for the passage of said strand therethrough, a pair of feed rolls, at least one of said feed rolls having a resilient peripheral surface, means mounting said feed rolls with the surfaces thereof making line contact over substantially the entire lengths thereof to form a seal, said seal providing a nip through which said strand extends, means for driving at least one of said feed rolls to advance said strand through said gap, means for rotating said cooperating rolls in the direction of movement of said strand through said gap, and means for passing a stream of air through said gap simultaneously with the movement of said strand through said gap.

2. Apparatus as in claim 1 in which said air stream passing means directs air through said gap in a direction opposite to the direction of strand movement.

3. Apparatus as in claim 1 in which at least one of said cooperating rolls is formed with a circumferential groove intermediate the ends thereof, said cooperating roll mounting means mounting the said cooperating rolls with end portions thereof outside said groove in contact.

* * * * *